W. A. CROW.
COTTON CHOPPER.
APPLICATION FILED JAN. 24, 1913.
1,074,494.
Patented Sept. 30, 1913.
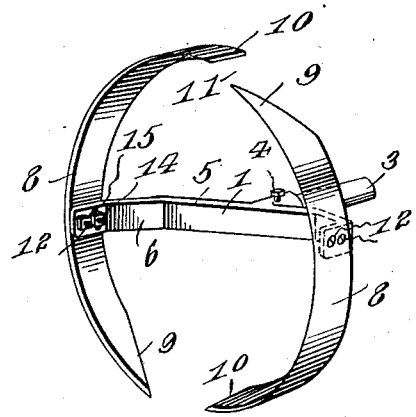
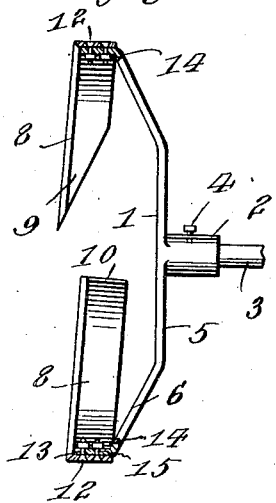
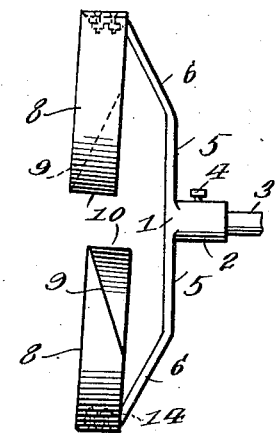
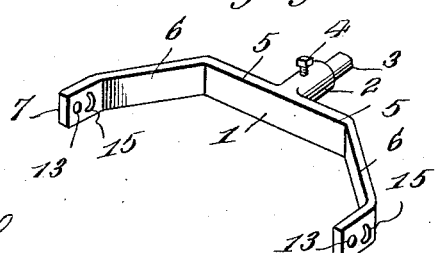
Witnesses
Frank Hough
James T. Koehl
Inventor
William A. Crow,
By Victor J. Evans
Attorney

UNITED STATES PATENT OFFICE.

WILLIAM A. CROW, OF CHICKASHA, OKLAHOMA.

COTTON-CHOPPER.

1,074,494.  Specification of Letters Patent. Patented Sept. 30, 1913.

Application filed January 24, 1913. Serial No. 744,005.

*To all whom it may concern:*

Be it known that I, WILLIAM A. CROW, a citizen of the United States, residing at Chickasha, in the county of Grady and State of Oklahoma, have invented new and useful Improvements in Cotton-Choppers, of which the following is a specification.

This invention relates to cotton choppers, and particularly to an improvement in the rotary chopper forming part of a Patent No. 941,230, issued to me Nov. 23, 1909; and it has for an object the provision of a chopper which will include companion arcuate chopping elements whose ends are associated relatively at diametrically opposite points and provided with cutting surfaces relatively associated whereby to permit of their operative presentation to the soil at comparatively close intervals when the chopper driving or power transmitting mechanism is driven at a slow rate of speed.

Another object of the invention is the provision of a support which will hold the chopping blades in such manner as will effectually permit of relative lateral adjustment of the adjacent ends, so as to cause the extreme chopping points to be arranged at the required distances laterally of each other.

A still further object of the invention is to provide a chopper wherein the chopping elements may be readily removed when worn and replaced by new elements at a comparatively low cost.

With these and other objects in view, the invention consists of certain novel features of construction, combination and arrangement of parts, as will be hereinafter described and claimed.

In the accompanying drawings:—Figure 1 is a perspective view of the chopper; Fig. 2 is an edge view thereof; Fig. 3 is a vertical section therethrough, showing parts in full lines; and Fig. 4 is a perspective view of the support.

The chopper comprises a support 1 having a central integral socket 2 which may be held in an applied position upon the driving shaft 3 through the medium of a clamping screw 4 or a suitable equivalent thereof. The support is provided with oppositely extending lateral portions 5 having their terminals bent at an angle as at 6 and then provided with blades attaching flanges or extremities 7.

The chopping blades 8 are preferably constructed of steel, each being of arcuate configuration and provided at one end with a relatively sharp point 9 which is spaced from the adjacent sharp edge 10 of the companion blade, so as to provide an intervening gap 11 to permit of the cutting out of the plant at the desired intervals. Each blade is provided with a bolt 12, which extends through a circular passage 13 in the attaching flange 7 and a second bolt 14 which is extended through an arcuate slot 15 in the attaching flange and which is designed to accommodate the blades for adjustments angularly of the flange, so that the cutting point of one blade can be adjusted laterally of the adjacent spaced end of the other blade to suit the requirement and to cause the effective cutting points 9 to be disposed in the proper relative plane. It is of course understood that the two bolts operate to hold the blades in their adjusted positions upon the support.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as claimed.

Having thus described my invention, what I claim is:—

In a cotton chopper, a support having an integral socket, the said support having a pair of arms radiating from the socket and then bent angularly away from the socket and provided with oppositely disposed terminals, identical reversely arranged cutting blades mounted on said terminals for angular adjustments relative to said flanges and having their ends spaced from each other, and means for holding said blades in adjusted positions.

In testimony whereof I affix my signature in presence of two witnesses.

WILLIAM A. CROW.

Witnesses:
A. W. PRATT,
O. H. ELLIOTT.

---

Copies of this patent may be obtained for five cents each, by addressing the "Commissioner of Patents, Washington, D. C."